(12) United States Patent
Iwai et al.

(10) Patent No.: US 11,695,607 B2
(45) Date of Patent: *Jul. 4, 2023

(54) WIRELESS TRANSMISSION DEVICE, WIRELESS RECEPTION DEVICE, TRANSMISSION METHOD, AND RECEPTION METHOD

(71) Applicant: Panasonic Intellectual Property Corporation of America, Torrance, CA (US)

(72) Inventors: Takashi Iwai, Ishikawa (JP); Tomohumi Takata, Ishikawa (JP); Hidetoshi Suzuki, Kanagawa (JP); Tetsuya Yamamoto, Kanagawa (JP); Quan Kuang, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,281

(22) Filed: Jan. 18, 2022

(65) Prior Publication Data

US 2022/0141066 A1 May 5, 2022

Related U.S. Application Data

(63) Continuation of application No. 16/322,853, filed as application No. PCT/JP2017/022623 on Jun. 20, 2017, now Pat. No. 11,258,644.

(30) Foreign Application Priority Data

Sep. 28, 2016 (JP) .................................. 2016-189234

(51) Int. Cl.
 H04L 27/26 (2006.01)
 H04J 13/00 (2011.01)
 H04L 5/00 (2006.01)

(52) U.S. Cl.
 CPC ...... *H04L 27/2613* (2013.01); *H04J 13/0062* (2013.01); *H04L 5/0051* (2013.01); *H04L 27/26025* (2021.01)

(58) Field of Classification Search
 CPC ........... H04L 27/2613; H04L 27/26025; H04L 5/0051; H04J 13/0062
 (Continued)

(56) References Cited

U.S. PATENT DOCUMENTS

2012/0026962 A1 2/2012 Inoue et al.
2013/0070719 A1 3/2013 Xu et al.
(Continued)

OTHER PUBLICATIONS

International Search Report, dated Sep. 12, 2017 for International Application No. PCT/JP2017/022623, 3 pages.
(Continued)

*Primary Examiner* — Candal Elpenord
(74) *Attorney, Agent, or Firm* — Seed IP Law Group LLP

(57) ABSTRACT

When a plurality of the subcarrier spacing values are applied, a reference signal is generated by using a sequence having a sequence length corresponding to a first ratio of a first subcarrier spacing set for transmission data to the maximum settable subcarrier spacing. The sequence of the reference signal is mapped to a frequency resource at mapping intervals in accordance with a second ratio which is the reciprocal of the first ratio, and the transmission data and the reference signal are transmitted.

11 Claims, 10 Drawing Sheets

(58) Field of Classification Search
USPC .................................................. 370/329–330
See application file for complete search history.

(56) References Cited

U.S. PATENT DOCUMENTS

| | | |
|---|---|---|
| 2017/0366311 A1 | 12/2017 | Iyer et al. |
| 2019/0007152 A1* | 1/2019 | Yi .......................... H04L 5/0028 |
| 2019/0044646 A1* | 2/2019 | Xu .......................... H04L 1/0025 |
| 2019/0081761 A1 | 3/2019 | Liu et al. |
| 2019/0090126 A1 | 3/2019 | Hayashi et al. |
| 2019/0123872 A1 | 4/2019 | Au et al. |
| 2019/0349167 A1 | 11/2019 | Gao et al. |

OTHER PUBLICATIONS

Huawei, HiSilicon, "Discussion on Channel Multiplexing of RS for High Frequency," R1-167222, Agenda Item: 8.1.6, 3GPP TSG RAN WG1 Meeting #86, Gothenburg, Sweden, Aug. 22-26, 2016, 2 pages.

Ericsson, "Concatenated block RS design," R1-167080, Agenda Item: 8.1.3.2, 3GPP TSG-RAN WG1#86, Gothenburg, Sweden Aug. 22-26, 2016, 3 pages.

MCC Support, "Draft Report of 3GPP TSG RAN WG1 #86 v0.2.0 (Gothenburg, Sweden, Aug. 22-26, 2016)," R1-16xxxx, 3GPP TSG RAN WG1 Meeting #86bis, Lisbon, Portugal, Oct. 10-14, 2016, Published on Sep. 12, 2016, 153 pages.

\* cited by examiner

WIRELESS TRANSMISSION DEVICE, WIRELESS RECEPTION DEVICE, TRANSMISSION METHOD, AND RECEPTION METHOD

TECHNICAL FIELD

The present disclosure relates to a wireless transmission device, a wireless reception device, a transmission method, and a reception method.

BACKGROUND ART

With widespread use of services using mobile broadband in recent years, data traffic has exponentially increased in mobile communication. Thus, it becomes imperative to expand the capacity of data transmission for the future. In addition, in the future, it is expected that IoT (Internet of Things) will be dramatically developed so that every-thing is connected via the Internet. To support the diversification of services by IoT, it is required that various factors, such as low latency and communication area (coverage), be dramatically improved, in addition to the data transmission capacity. For these background reasons, the fifth generation mobile communication system (5G) has been progressively developed and standardized, which greatly improves the performance and functions as compared with the 4th generation mobile communication system (4G).

One of the radio access technologies (RATs: Radio Access Technologies) of 4G is LTE-Advanced, which is standardized by 3GPP. Currently, in standardization of 5G, 3GPP is developing a new radio access technology (NR: New RAT) which does not necessarily have backward compatibility with LTE-Advanced. In 5G, the performance needs to be greatly improved by introducing NR.

In OFDM (Orthogonal Frequency Division Multiplexing) transmission, LTE adopts, as a signal waveform, an OFDM symbol having a subcarrier spacing of 15 kHz, which is the frequency spacing between individual carriers (also referred to as "subcarriers") that transmit signals. At this time, in the high frequency band, an impact of interference between subcarriers caused by phase noise can be reduced by increasing the subcarrier spacing. Furthermore, by increasing the subcarrier spacing, the OFDM symbol length is reduced and, thus, TTI (Transmission Time Interval) of packet transmission can be reduced. In this manner, low delay can be achieved. Accordingly, in NR, it is currently being studied to flexibly apply a plurality of subcarrier spacing values for each of cells, each of carrier frequency bands, or each of sub-bands. In addition, in NR, it is currently being studied to make the subcarrier spacing temporally variable.

More specifically, in NR, it is agreed that subcarrier spacing of $2^n \times 15$ kHz (n is an integer) is applied on the basis of a subcarrier spacing of 15 kHz applied in LTE. In NR, it is agreed that even when any one of subcarrier spacing values is applied, an RB (Resource block), which is a frequency resource unit composed of a fixed number (for example, 12) of subcarriers, is arranged with a grid pattern common to the cells (that is, the RB boundaries are aligned) (refer to, for example, NPL 1). That is, an RB having a narrow bandwidth (an RB having narrow subcarrier spacing) is arranged within the band of an RB having a wide bandwidth (an RB having wide subcarrier spacing), and RBs are defined so as to be nested in the frequency domain.

In NR, it is agreed that the time length of an OFDM symbol with a subcarrier spacing of $2^m \times 15$ kHz (m is an integer) is exactly scaled to a ratio of $\frac{1}{2}^m$ (refer to, for example, NPL 1). For example, a relationship between the time length (=time length A) of an OFDM symbol with a subcarrier spacing of 15 kHz (m=0) and the time length (=time length B) of an OFDM symbol with a subcarrier spacing of 60 kHz (m=2) is described as "the time length A=4×the time length B". Note that the OFDM symbol length includes the time length of CP (Cyclic Prefix).

Like LTE, in NR, a transmission method based on CP-OFDM (OFDM to which CP is added) is being studied. Accordingly, like LTE, even in NR, it is studied that Zadoff-Chu sequence (ZC sequence) is used as a reference signal (e.g., DMRS (Demodulation Reference Signal) or SRS (Sounding Reference Signal)) (refer to, for example, NPLs 2 and 3).

The ZC sequence has the following properties: the frequency characteristic is uniform, the auto-correlation property and the cross-correlation property are excellent, and the Cubic Metric (CM)/PAPR (Peak to Average Power Ratio) is low. By using, as the reference signal, a ZC sequence having such property, inter-cell interference and inter-stream interference can be reduced. As a result, the channel estimation accuracy can be improved. Even in NR, by using, as a reference signal, a ZC sequence the same as in LTE, the channel estimation accuracy can be improved and, thus, the system performance can be increased.

The ZC sequence $x_q(m)$ serving as the data demodulation reference signal (DMRS) used in the uplink of LTE is expressed by the following Equation (1).

[Formula 1]
$$x_q(m) = e^{-j\frac{\pi qm(m+1)}{N_{ZC}}}, 0 \le m \le N_{ZC} - 1 \quad (1)$$

Here, q is a sequence group number and is an integer where $1 \le q \le N_{ZC}-1$. $N_{ZC}$ represents the sequence length of the ZC sequence. When the bandwidth of the reference signal is $N_{SC}$ [subcarrier], $N_{ZC}$ is expressed by the following Equation (2).

[Formula 2]
$$N_{ZC} = \max(\text{primes}(N_{SC})) \quad (2)$$

In Equation (2), the function primes(X) represents the prime numbers of an integer X, and the function max(Y) represents the largest value in a numerical value group Y. That is, the sequence length $N_{ZC}$ is the largest prime number not exceeding the bandwidth $N_{SC}$.

For example, suppose that 12 [subcarrier] are assigned to each of RBs. Then, if the bandwidth of the reference signal is 24 RBs, $N_{SC}=24\times12=288$ [subcarrier]. In this case, as can be seen from Equation (2), $N_{ZC}=283$. In addition, by cyclically expanding the ZC sequence of $N_{ZC}=283$ (by copying the front part of data in the sequence to the tail end of the sequence), a reference signal of $N_{SC}=288$ is generated.

In addition, in LTE, sequence group hopping is adopted for temporally and randomly switching the sequence group number ("q" in Equation (1)) used in each of the cells, so that the effect of inter-cell interference on the reference signal is randomized. In this manner, the channel estimation accuracy is improved.

CITATION LIST

Non Patent Literature

NPL 1: "RAN 1 Chairman's Notes," 3GPP TSG RAN WG1 #86, August 2016
NPL 2: R1-167222, Huawei, HiSilicon, "Discussion on Channel Multiplexing of RS for High Frequency," 3GPP TSG RAN WG1 #86, August 2016
NPL 3: R1-167080, Ericsson, "Concatenated block RS design," 3GPP TSG RAN WG1 #86, August 2016

SUMMARY OF INVENTION

However, if different subcarrier spacing values are applied to neighboring cells, interference may occur between the reference signals (for example, DMRSs) having different OFDM symbol lengths. Thus, the channel estimation accuracy may deteriorate.

One non-limiting and exemplary embodiment of the present disclosure facilitates providing a wireless transmission device, a wireless reception device, a transmission method, and a reception method capable of improving the channel estimation accuracy by reducing interference between reference signals even when a plurality of subcarrier spacing values are applied.

According to an general aspect of the present disclosure, a wireless transmission device includes a generation unit that generates a reference signal by using a sequence having a sequence length corresponding to a first ratio of first subcarrier spacing set for transmission data to the maximum settable subcarrier spacing, a mapping unit that maps the sequence of the reference signal to predetermined subcarriers at mapping intervals in accordance with a second ratio which is the reciprocal of the first ratio, and a transmission unit that transmits the transmission data and the reference signal.

According to an general aspect of the present disclosure, a wireless reception device includes a reception unit that receives a reception signal including transmission data and a reference signal transmitted from a wireless transmission device, a generation unit that generates a replica of the reference signal by using a sequence having a sequence length corresponding to a first ratio of first subcarrier spacing set for the transmission data to the maximum settable subcarrier spacing, a demapping unit that extracts the sequence mapped to a predetermined subcarrier from the reference signal on the basis of mapping intervals in accordance with a second ratio which is a reciprocal of the first ratio, a channel estimation unit that calculates a channel estimation value by using the extracted sequence and the replica, and a frequency domain equalization unit that performs an equalization process on the transmission data by using the channel estimation value.

According to an general aspect of the present disclosure, a transmission method includes generating a reference signal by using a sequence having a sequence length corresponding to a first ratio of first subcarrier spacing set for transmission data to the maximum settable subcarrier spacing, mapping the sequence of the reference signal to predetermined subcarriers at mapping intervals in accordance with a second ratio which is a reciprocal of the first ratio, and transmitting the transmission data and the reference signal.

According to an general aspect of the present disclosure, a reception method includes receiving a reception signal including transmission data and a reference signal transmitted from a wireless transmission device, generating a replica of the reference signal by using a sequence having a sequence length corresponding to a first ratio of first subcarrier spacing set for the transmission data to the maximum settable subcarrier spacing, extracting the sequence mapped to a predetermined subcarrier from the reference signal on the basis of mapping intervals in accordance with a second ratio which is a reciprocal of the first ratio, calculating a channel estimation value by using the extracted sequence and the replica, and performing an equalization process on the transmission data by using the channel estimation value.

It should be noted that general or specific embodiments may be implemented as a system, a method, an integrated circuit, a computer program, a storage medium, or any selective combination thereof.

According to an general aspect of the present disclosure, even when a plurality of subcarrier spacing values are applied, interference between reference signals can be reduced and, thus, the channel estimation accuracy can be improved.

Additional benefits and advantages of an aspect of the present disclosure will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
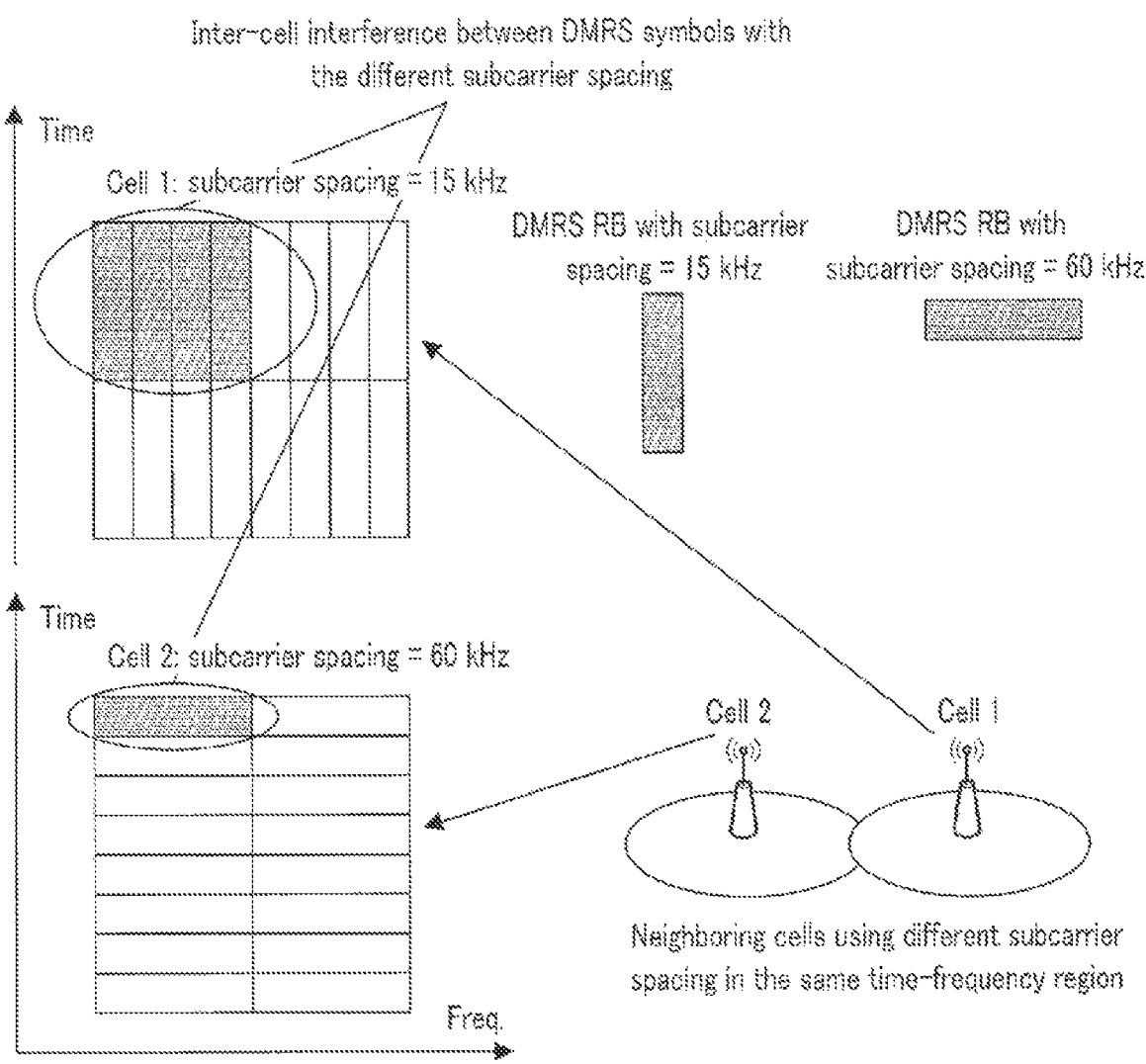
FIG. 1 illustrates interference between cells having different subcarrier spacing values applied thereto.

As an example in which a plurality of subcarrier spacing values are applied, when, as illustrated in FIG. 1, different subcarrier spacing values are applied to neighboring cells, interference occurs between reference signals (for example, DMRSs) having different OFDM symbol lengths. More specifically, when ZC sequences with different sequence lengths are used as reference signals for the cells, there is a possibility that a significantly large cross-correlation value (that is, corresponding to inter-cell interference) occurs depending on the combination of sequence group numbers. If significant inter-cell interference occurs, the channel estimation accuracy deteriorates and, thus, the system performance of NR deteriorates.

Figure 2:
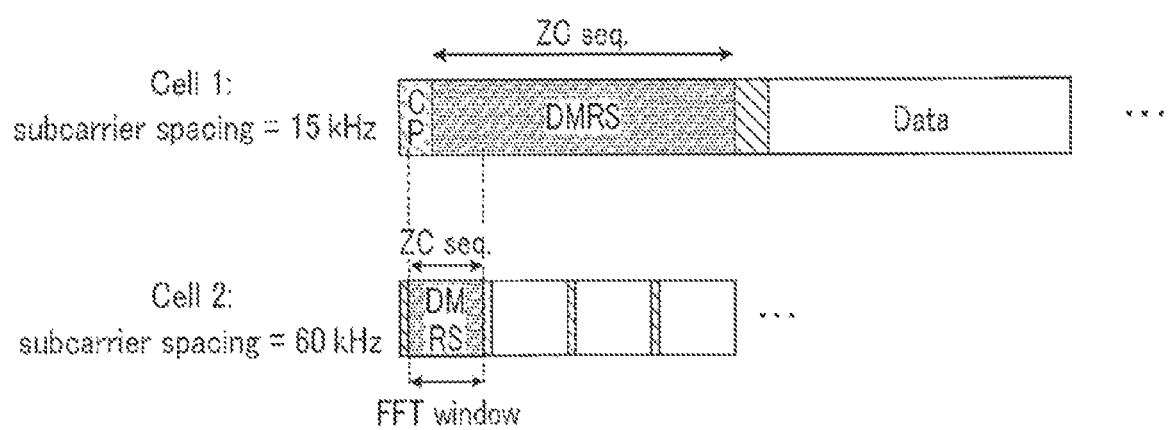
FIG. 2 illustrates an example of the configuration of a symbol between cells having different subcarrier spacing values applied thereto.

For example, FIG. 1 illustrates neighboring cells 1 and 2. In FIG. 1, the subcarrier spacing of cell 1 is 15 kHz, and the subcarrier spacing of cell 2 is 60 kHz. In this case, the time length of the OFDM symbol of the reference signal is four times longer in cell 1 than in cell 2. For example, as illustrated in FIG. 2, when the time-frequency resources to which the symbols of the reference signals are mapped overlap between cell 1 and cell 2, the FFT (Fast Fourier Transform) window width in the reference signal reception process performed by the receiver (a base station or a terminal) of cell 2 is part (¼ time length) of the reference signal in cell 1. That is, there is a possibility that the ZC sequence used as the reference signal in cell 2 exhibits a cross-correlation with part of the ZC sequence used as the reference signal of cell 1.

Note that a certain ZC sequence and a ZC sequence including the entire sequence length of the ZC sequence (that is, ZC sequences of the same sequence length) exhibit excellent cross-correlation property. In contrast, a large cross-correlation value is produced between a certain ZC sequence and another ZC sequence including part of the sequence length of the ZC sequence (that is, between ZC sequences with different sequence lengths), depending on a combination of sequence group numbers. That is, depending on the combination of the sequence group numbers, the waveform of the ZC sequence including the entire sequence length (a ZC sequence having a short sequence length) becomes very close to part of the waveform of the ZC sequence (the ZC sequence having a long sequence length) which serves as an interference signal. Thus, a large cross-correlation value is produced.

Figure 3:
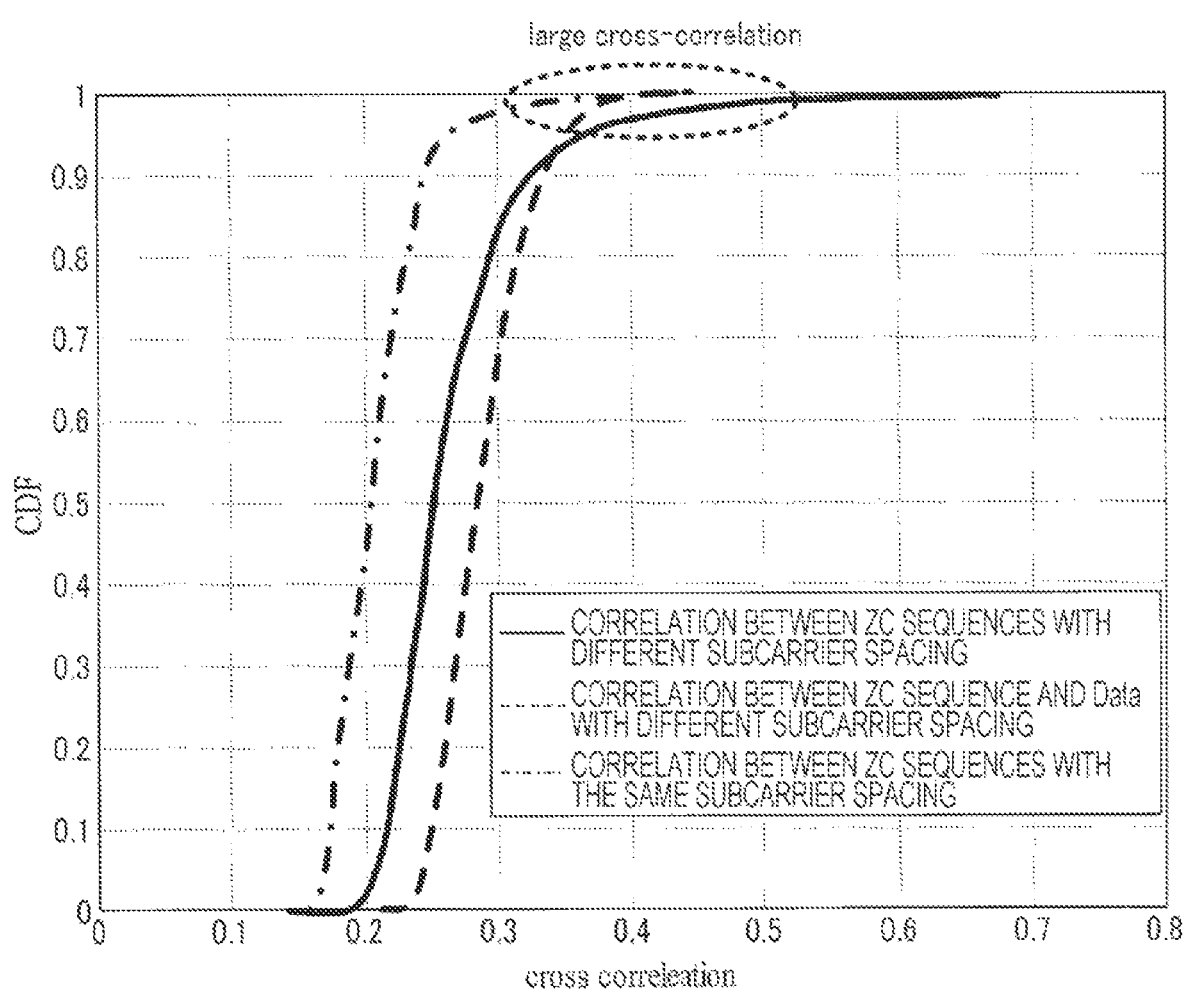
FIG. 3 illustrates an example of the cross-correlation property between ZC sequences.

FIG. 3 is a diagram illustrating an example of the cross-correlation property between ZC sequences for each of different combinations of sequence group numbers. The cross-correlation property is obtained by computer simulation.

The line labeled "correlation between ZC sequences with different subcarrier spacing" (a solid line) on FIG. 3 represents the cross-correlation property between ZC sequences under the conditions illustrated in FIG. 1 and FIG. 2. More specifically, for cell 1, the subcarrier spacing is 15 kHz, the reference signal band is 24 RBs (=24×12×15 kHz=4.32 MHz), the reference signal bandwidth $N_{SC}$=288 (=12×24) [subcarrier], and the sequence length $N_{ZC}$=283 ($N_{ZC}$ is the largest prime number not exceeding $N_{SC}$, refer to equation (2)). In contrast, for cell 2, the subcarrier spacing is 60 kHz, the reference signal band is 6 RBs (=24×12×60 kHz=4.32 MHz), $N_{SC}$=72 (=12×6) [subcarrier], and $N_{ZC}$=71. In addition, cell 2 is a receiver cell, and cell 1 is a transmitter cell from which the interference signal is transmitted.

In addition, the line labeled "correlation between ZC sequences with the same subcarrier spacing" (an alternate long and short dashed line) on FIG. 3 is used as reference data and represents the cross-correlation property between ZC sequences of reference signals in LTE. More specifically, for cell 1, the subcarrier spacing is 15 kHz, the reference signal band is 24 RBs (4.32 MHz), $N_{SC}$=288 [subcarrier], and $N_{ZC}$=283. Furthermore, for cell 2, the subcarrier spacing is 15 kHz, the reference signal band is 6 RBs (=6×12×15 kHz=1.08 MHz), $N_{SC}$=72 (=12×6) [subcarrier], and $N_{ZC}$=71.

Furthermore, the line labeled "correlation between ZC sequence and Data with different subcarrier spacing" (a dashed line) on FIG. 3 is used as reference data and represents the cross-correlation property when Data of cell 1 interferes with the reference signal of cell 2 under the conditions illustrated in FIG. 1 and FIG. 2. More specifically, Data of cell 1 is random QPSK data with a subcarrier spacing of 15 kHz and a Data band of 24 RBs (4.32 MHz). In addition, for cell 2, the subcarrier spacing is 60 kHz, the reference signal band is 6 RBs (4.32 MHz), $N_{SC}$=72 (=12×6) [subcarrier], and $N_{ZC}$=71.

As can be seen from FIG. 3, the "correlation between ZC sequences with different subcarrier spacing" has a higher cross-correlation value between ZC sequences than the "correlation between ZC sequences at the same subcarrier spacing" (that is, the inter-cell interference becomes larger).

In addition, if time synchronization between cells cannot be achieved, the time-frequency resources of the reference signal (the ZC sequence) and the data overlap. Consequently, interference occurs, and the property indicated by the line labeled "correlation between the ZC sequence and Data with different subcarrier spacing" on FIG. 3 is acquired. As can be seen from FIG. 3, there is almost no probability of an increase in the cross-correlation value (for example, the probability that the cross-correlation value becomes 0.4 or greater) in the "correlation between ZC sequence and Data at different subcarrier spacing". In contrast, a combination of sequence groups having a large cross-correlation value (for example, a cross-correlation value of 0.4 or greater) occurs with a probability of about 4% in the "correlation between ZC sequences with different subcarrier spacing".

Since the increase in the cross-correlation value between the ZC sequences with different subcarrier spacing leads to an increase in inter-cell interference, the channel estimation accuracy of the reference signal (e.g., DMRS or SRS) using the ZC sequence deteriorates.

Therefore, one aspect of the present disclosure prevents an increase in the cross-correlation value between ZC sequences with different subcarrier spacing and improves the channel estimation accuracy of a reference signal using a ZC sequence.

Embodiments of the present disclosure are described in detail below with reference to the accompanying drawings.

[Outline of Communication System]

A communication system according to an embodiment of the present disclosure includes a wireless transmission device 100 and a wireless reception device 200. In the case of a downlink, the wireless transmission device 100 serves as a base station device (also referred to as eNB or gNB), and the wireless reception device 200 serves as a terminal device (also referred to as UE). In the case of an uplink, the wireless transmission device 100 serves as a terminal device, and the wireless reception device 200 serves as a base station device.

In the following description, it is assumed that the reference signal and the data are time-multiplexed. However, as described below, an aspect of the present disclosure can be applied to the case in which the reference signal and the data are frequency-multiplexed in the same manner.

Figure 4:
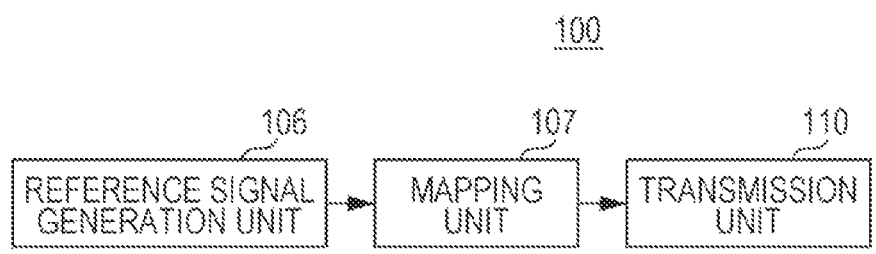
FIG. 4 illustrates the configuration of a main part of a wireless transmission device according to the present disclosure.

FIG. 4 is a block diagram illustrating the configuration of a main part of the wireless transmission device 100 according to the embodiment of the present disclosure. In the wireless transmission device 100 illustrated in FIG. 4, a reference signal generation unit 106 generates a sequence (for example, a ZC sequence) having a sequence length corresponding to the first ratio of the first subcarrier spacing value set for transmission data to the maximum settable subcarrier spacing value, and a mapping unit 107 maps the sequence of the reference signal to the frequency resources at a mapping interval corresponding to a second ratio which is the reciprocal of the first ratio. In addition, a transmission unit 110 transmits the transmission data and the reference signal.

Figure 5:
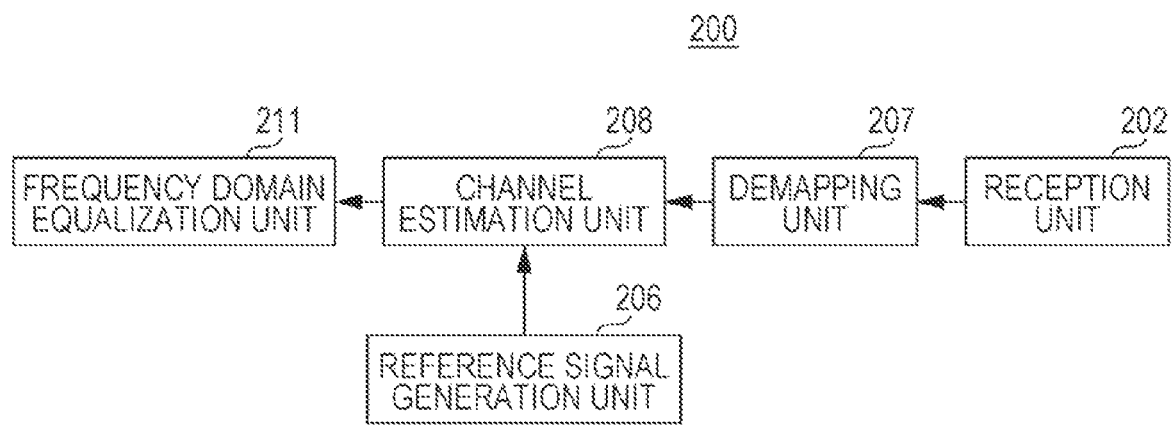
FIG. 5 illustrates the configuration of a main part of a wireless reception device according to the present disclosure.

FIG. 5 is a block diagram illustrating the configuration of a main part of the wireless reception device 200 according to the embodiment of the present disclosure. In the wireless reception device 200 illustrated in FIG. 5, a reception unit 202 receives a reception signal including the transmission data and the reference signal transmitted from the wireless transmission device 100, and a reference signal generation unit 206 generates a replica of the reference signal by using a sequence having a sequence length corresponding to the first ratio of the first subcarrier spacing value set for the transmission data to the maximum settable subcarrier spacing value. In addition, a demapping unit 207 extracts, from the reception signal, the sequence of the reference signal on the basis of a mapping interval corresponding to a second ratio which is the reciprocal of the first ratio. A channel estimation unit 208 calculates a channel estimation value by using the extracted sequence and the replica. A frequency domain equalization unit 211 performs an equalization process on the transmission data by using the channel estimation value.

[Configuration of Wireless Transmission Device]

Figure 6:
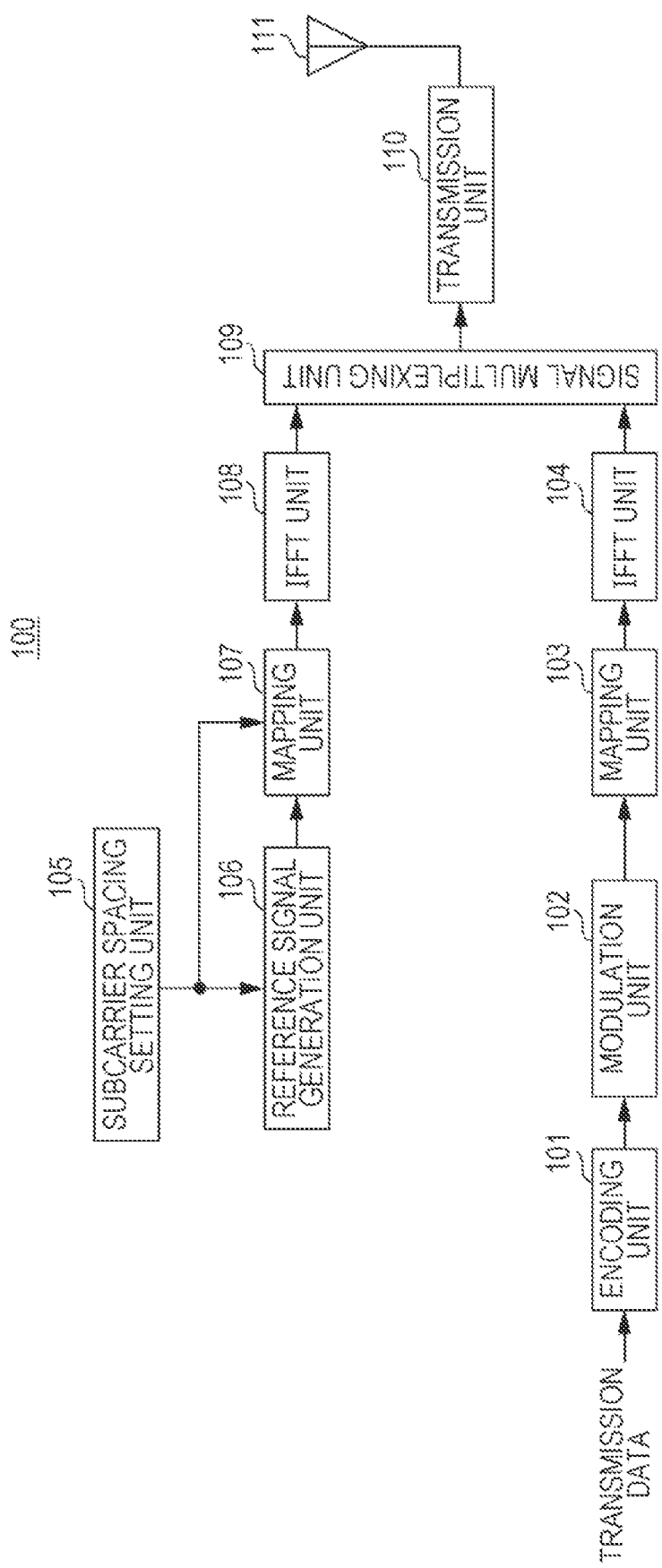
FIG. 6 illustrates the configuration of a wireless transmission device according to the present disclosure.

FIG. 6 is a block diagram illustrating the configuration of the wireless transmission device 100 according to the present embodiment. In FIG. 6, the wireless transmission device 100 includes an encoding unit 101, a modulation unit 102, a mapping unit 103, an IFFT (Inverse Fast Fourier Transform) unit 104, a subcarrier spacing setting unit 105, a reference signal generation unit 106, a mapping unit 107, an IFFT unit 108, a signal multiplexing unit 109, a transmission unit 110, and an antenna 111.

The wireless transmission device 100 transmits the transmission data and the reference signal (DMRS) to the wireless reception device 200.

In the wireless transmission device 100, the encoding unit 101 performs a predetermined error correction coding process on the transmission data destined for the wireless reception device 200 that is present in the same cell as the wireless transmission device 100 and outputs encoded transmission data to the modulation unit 102.

The modulation unit 102 modulates the encoded transmission data output from the encoding unit 101 and outputs the modulated transmission data to the mapping unit 103.

The mapping unit 103 maps the modulated transmission data output from the modulation unit 102 to a predetermined transmission band (a subcarrier) and outputs the mapped transmission data to the IFFT unit 104.

The IFFT unit 104 performs an IFFT process on the transmission data output from the mapping unit 103 and outputs an OFDM symbol having a CP added thereto to the signal multiplexing unit 109.

The subcarrier spacing setting unit 105 sets a subcarrier spacing value (for example, $2^n \times 15$ kHz (n is an integer)) for the transmission data and the maximum settable subcarrier spacing value assumed (or taken into consideration) in the communication system (for example, $2^{Nmax} \times 15$ kHz (Nmax is an integer)). The subcarrier spacing setting unit 105 outputs information indicating the set subcarrier spacing value to the reference signal generation unit 106 and the mapping unit 107.

The reference signal generation unit 106 generates a reference signal by using the subcarrier spacing value set by the subcarrier spacing setting unit 105 ($2^n \times 15$ kHz, and $2^{Nmax} \times 15$ kHz) and a ZC sequence having a sequence length in accordance with the transmission bandwidth ($N_{SC}$ [subcarrier]) of the reference signal. For example, the reference signal generation unit 106 calculates, as the sequence length, the largest prime number not exceeding the value obtained by multiplying the ratio of the subcarrier spacing value set for the transmission data to the maximum subcarrier spacing value ($2^n/2^{Nmax}$) by the bandwidth $N_{SC}$ of the reference signal. The reference signal generation unit 106 outputs, to the mapping unit 107, the ZC sequence having the calculated sequence length as a reference signal.

The mapping unit 107 calculates a mapping interval of the reference signal (the ZC sequence) output from the reference signal generation unit 106 on the basis of the subcarrier spacing values set by the subcarrier spacing setting unit 105 ($2^n \times 15$ kHz and $2^{Nmax} \times 15$ kHz). Thereafter, the mapping unit 107 maps the reference signal into a predetermined transmission band (subcarrier) by using the calculated mapping interval. More specifically, the mapping unit 107 maps the ZC sequence to the subcarriers at equal intervals that are the subcarriers equal in number to the ratio of the maximum subcarrier spacing to the subcarrier spacing set for the transmission data ($2^{Nmax}/2^n$, that is, the reciprocal of the ratio used in the reference signal generation unit 106). Thereafter, the mapping unit 107 outputs, to the IFFT unit 108, the reference signal subjected to the mapping process.

The IFFT unit 108 performs an IFFT process on the reference signal output from the mapping unit 107 and outputs, to the signal multiplexing unit 109, an OFDM symbol obtained by adding a CP to the signal subjected to the IFFT process.

The signal multiplexing unit 109 time-multiplexes the OFDM symbol (the transmission data) output from the IFFT unit 104 and the OFDM symbol (the reference signal) output from the IFFT unit 108 on the basis of a predetermined frame format. Thereafter, the signal multiplexing unit 109 outputs the time-multiplexed signal to the transmission unit 110.

The transmission unit 110 performs a transmission process, such as D/A conversion, up-conversion, and amplification, on the signal output from the signal multiplexing unit 109. Thereafter, the transmission unit 110 transmits the signal subjected to the transmission process via the antenna 111.

[Configuration of Wireless Reception Device]

Figure 7:
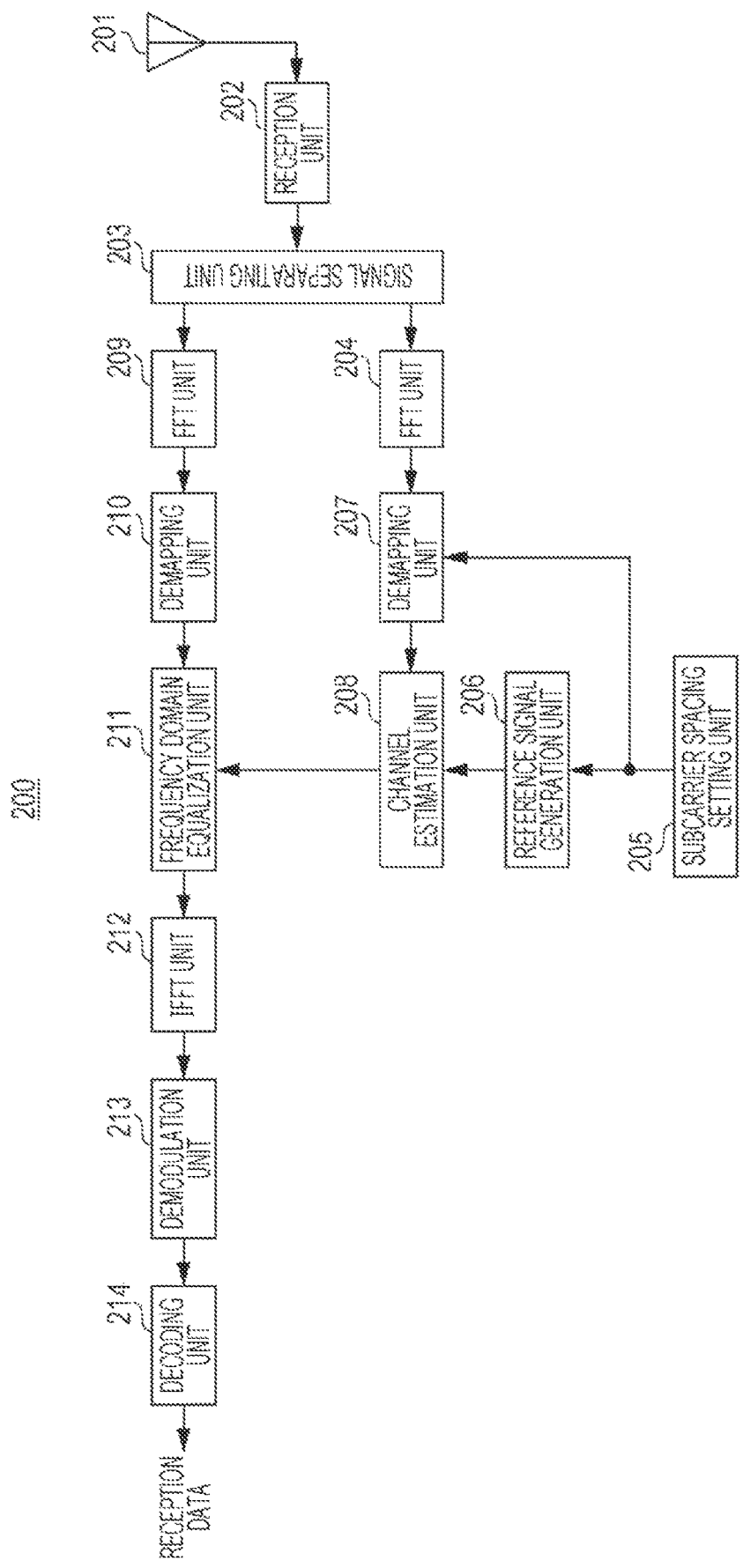
FIG. 7 illustrates the configuration of a wireless reception device according to the present disclosure.

FIG. 7 is a block diagram illustrating the configuration of the wireless reception device 200 according to the present embodiment. In FIG. 7, the wireless reception device 200 includes an antenna 201, a reception unit 202, a signal separating unit 203, an FFT (Fast Fourier Transform) unit 204, a subcarrier spacing setting unit 205, a reference signal generation unit 206, A demapping unit 207, a channel estimation unit 208, an FFT unit 209, a demapping unit 210, a frequency domain equalization unit 211, an IFFT unit 212, a demodulation unit 213, and a decoding unit 214.

The wireless reception device 200 illustrated in FIG. 7 receives the transmission data and the reference signal (DMRS) transmitted from the wireless transmission device 100 and decodes the reception data.

In the wireless reception device 200, the reception unit 202 performs a reception process, such as down-conversion or A/D conversion, on the signal (including the data and the reference signal) received via the antenna 201. Thereafter, the reception unit 202 outputs the signal subjected to the reception process to the signal separating unit 203.

The signal separating unit 203 separates the OFDM symbol of the reception data from the OFDM symbol of the reference signal in the signal output from the reception unit 202 on the basis of a predetermined frame format. Thereafter, the signal separating unit 203 outputs the reference signal to the FFT unit 204 and outputs the reception data to the FFT unit 209.

The FFT unit 204 performs an FFT process on the time-domain reference signal output from the signal separating unit 203 to convert the reference signal into a frequency-domain signal. Thereafter, the FFT unit 204 outputs the converted frequency-domain reference signal to the demapping unit 207.

The subcarrier spacing setting unit 205 performs an operation the same as the operation performed by the subcarrier spacing setting unit 105 (FIG. 6) of the wireless transmission device 100. That is, the subcarrier spacing setting unit 205 sets the subcarrier spacing of the reception data (the transmission data transmitted from the wireless transmission device 100) (e.g., $2^n \times 15$ kHz (n is an integer)) and the maximum settable subcarrier spacing (e.g., $2^{Nmax} \times 15$ kHz (Nmax is an integer)) in the communication system. The subcarrier spacing setting unit 205 outputs information indicating the set subcarrier spacing values to the reference signal generation unit 206 and the demapping unit 207.

The reference signal generation unit 206 performs an operation the same as the operation performed by the reference signal generation unit 106 of the wireless transmission device 100. That is, the reference signal generation unit 206 calculates the sequence length of the ZC sequence on the basis of the subcarrier spacing values ($2^n \times 15$ kHz and $2^{Nmax} \times 15$ kHz) set by the subcarrier spacing setting unit 205 and the transmission bandwidth ($N_{SC}$ [subcarrier]) of the reference signal. Thereafter, the reference signal generation unit 206 generates a replica of the reference signal by using a ZC sequence having the calculated sequence length. Subsequently, the reference signal generation unit 206 outputs the replica of the reference signal to the channel estimation unit 208.

The demapping unit 207 calculates the mapping interval of the reference signal on the basis of the subcarrier spacing values ($2^n \times 15$ kHz and $2^{Nmax} \times 15$ kHz) set by the subcarrier spacing setting unit 205. Thereafter, the demapping unit 207 extracts, from the frequency-domain reference signal output from the FFT unit 204, the ZC sequence mapped to the transmission band (the subcarrier) of the wireless transmission device 100 on the basis of the calculated mapping interval. Subsequently, the demapping unit 207 outputs the extracted ZC sequence (referred to as a "reception ZC sequence") to the channel estimation unit 208.

The channel estimation unit 208 performs division of the reception ZC sequence output from the demapping unit 208 of the wireless transmission device 100 by using the ZC sequence (the replica of the reference signal) corresponding to the wireless transmission device 100 and output from the reference signal generation unit 206 in the frequency domain. In this manner, the channel estimation unit 208 calculates the frequency-domain channel estimation value (corresponding to a frequency response) and outputs the channel estimation value to the frequency domain equalization unit 211.

The FFT unit 209 performs an FFT process on the time-domain reception data signal output from the signal separating unit 203 to convert the time-domain reception data signal into a frequency-domain signal and outputs the converted frequency-domain reception data signal to the demapping unit 210.

The demapping unit 210 extracts, from the reception data signal output from the FFT unit 209, the reception data signals corresponding to the transmission band of the wireless transmission device 100 and outputs the extracted signals to the frequency domain equalization unit 211.

The frequency domain equalization unit 211 performs a frequency-domain equalization process on the reception data signal output from the demapping unit 210 by using the channel estimation value (the frequency response of the propagation channel) output from the channel estimation unit 208. Thereafter, the frequency domain equalization unit 211 outputs, to the IFFT unit 212, the reception data signal subjected to the equalization process.

The IFFT unit 212 performs an IFFT process on the reception data signal output from the frequency domain equalization unit 211 and outputs, to the demodulation unit 213, the time-domain reception data signal subjected to the IFFT process.

The demodulation unit 213 performs a demodulation process on the time-domain reception data signal output from the IFFT unit 212 and outputs the demodulated reception data signal to the decoding unit 214.

The decoding unit 214 performs a decoding process on the demodulated reception data signal output from the demodulation unit 213 and extracts the reception data.

[Operations Performed by Wireless Transmission Device 100 and Wireless Reception Device 200]

The operations performed by the wireless transmission device 100 and the wireless reception device 200 having the above-described configurations are described in detail below.

<Reference Signal Generation Method>

The reference signal (replica) generation processes performed by the reference signal generation units 106 and 206 of the wireless transmission device 100 and the wireless reception device 200, respectively, are described in detail first.

In the following description, the reference subcarrier spacing is set to the subcarrier spacing of 15 kHz in LTE. However, the reference subcarrier spacing is not limited to 15 kHz.

In addition, in the following description, the bandwidth of each of the transmission data and the reference signal is set to $N_{SC}$ [subcarrier], the subcarrier spacing set for the transmission data is $2^n \times 15$ kHz (n is an integer), and the maximum subcarrier spacing considered for the cell or the communication system is set to $2^{Nmax} \times 15$ kHz (Nmax is an integer). The maximum subcarrier spacing value to be considered may be the maximum subcarrier spacing value that can be set in the communication system. Alternatively, the maximum subcarrier spacing to be considered may be the maximum subcarrier spacing applied to a service that requires high quality, such as a service that requires low-latency and high-reliability communication (also referred to as "URLLC (Ultra Reliable Low Latency Communication").

In this case, the reference signal generation units 106 and 206 calculate the sequence length $N_{ZC}$ of the ZC sequence as follows.

[Formula 3]

$$N_{ZC} = \max\left(\text{primes}\left(N_{SC} \times \frac{2^n}{2^{Nmax}}\right)\right) \quad (3)$$

That is, the sequence length $N_{ZC}$ of the ZC sequence is the largest prime number not exceeding $N_{SC} \times (2^n/2^{Nmax})$.

Here, the parameter Nmax (or the maximum subcarrier spacing itself ($2^{Nmax} \times 15$ kHz)) used to set the maximum subcarrier spacing ($2^{Nmax} \times 15$ kHz), which is to be taken into account for the cell or the communication system, may be notified to the terminals connected to the base station in advance for each of the carrier frequencies or sub-bands. Alternatively, the parameter Nmax may be pre-set to a fixed value in the communication system.

Similarly, the parameter n (or the set subcarrier spacing value itself ($2^n \times 15$ kHz)) used to set the subcarrier spacing ($2^n \times 15$ kHz) for the transmission data may be notified to the terminals connected to the base station for each of the cells, each of the carrier frequencies, or each of the sub-bands.

For example, the following description is given with reference to the case in which the bandwidth of the reference signal is 24 RBs ($N_{SC}=12 \times 24=288$ [subcarrier]), the subcarrier spacing of the transmission data is 15 kHz (n=0), and the maximum subcarrier spacing is 60 kHz (Nmax=2). In this case, the reference signal generation units 106 and 206 set the sequence length $N_{ZC}$ of the ZC sequence to 71, which is the largest prime number not exceeding $288 \times (\frac{1}{4})=72$, on the basis of Equation (3). Thereafter, to modify the size of the reference signal to be an integer multiple of the RB unit (12 [subcarrier]), the reference signal generation units 106 and 206 perform cyclic expansion on the ZC sequence having a sequence length $N_{ZC}=71$ (copy the front part of the sequence data and append the data to the tail end of the sequence) and generate a reference signal having a bandwidth $N_{SC}=288 \times (\frac{1}{4})=72$.

<Method for Mapping Reference Signal>

The reference signal mapping (demapping) process performed by the mapping unit 107 of the wireless transmission device 100 and the demapping unit 207 of the wireless reception device 200 is described in detail below.

The mapping unit 107 maps the reference signals (the ZC sequence) generated as described above at a mapping interval of ($2^{Nmax}/2^n$) in the frequency domain. That is, the mapping unit 107 maps the ZC sequence into the frequency domain at equal intervals that are the subcarriers equal in number to ($2^{Nmax}/2^n$) which is the reciprocal of the subcarrier spacing ratio ($2^n/2^{nNmax}$) used for calculating the sequence length of the ZC sequence.

Figure 8A:
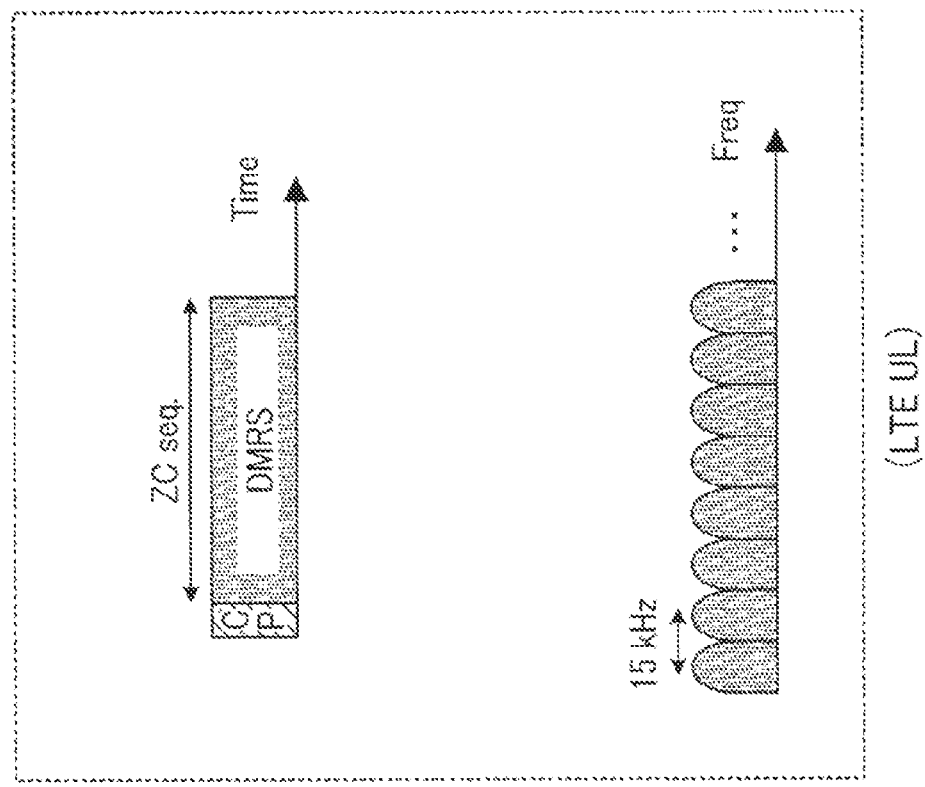
FIG. 8A illustrates an example of mapping of a reference signal in uplink of LTE.
Figure 8B:
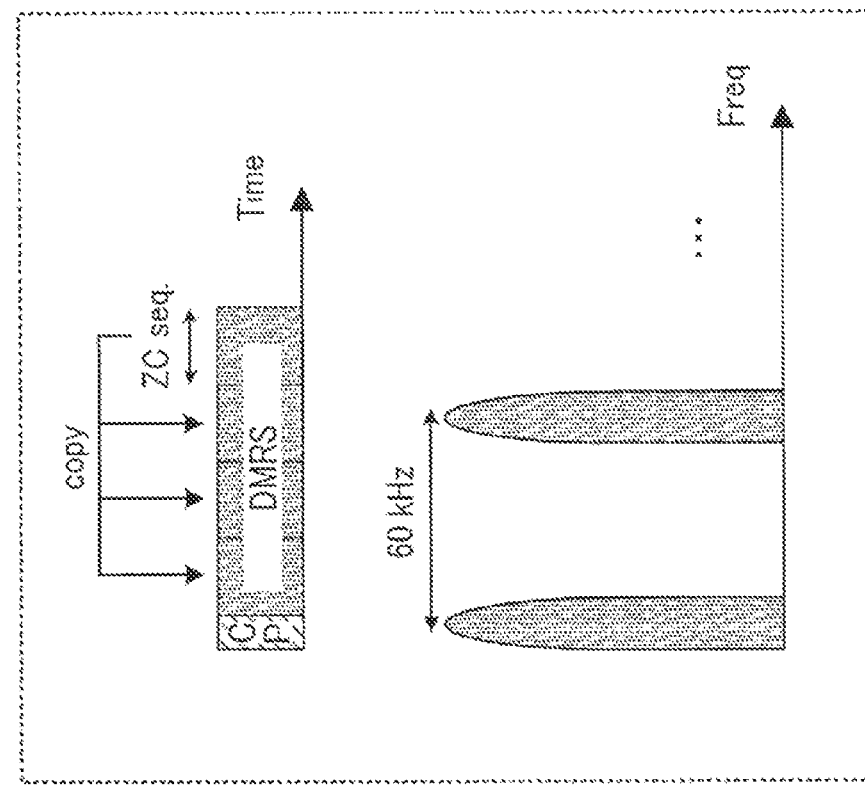
FIG. 8B illustrates an example of mapping of a reference signal according to the present disclosure.

For example, in the case where the subcarrier spacing set for the transmission data (the reference signal) is 15 kHz (n=0) and the maximum subcarrier spacing is 60 kHz (Nmax=2) (that is, ($2^{Nmax}/2^n$)=4), the mapping unit 107 maps the reference signals at equal intervals of 4 subcarriers (=60 kHz), as illustrated in FIG. 8B.

Equal-interval mapping at ($2^{Nmax}/2^n$)-subcarrier mapping intervals in the frequency domain is equivalent to repeating ($2^{Nmax}/2^n$) ZC sequences in the time domain. For example, in FIG. 8B, the wireless transmission device 100 continuously transmits, as the reference signals, 4 (=$2^{Nmax}/2^n$) ZC sequences in the time domain.

In addition, the demapping unit 207 of the wireless reception device 200 extracts, from the reference signal input from the FFT unit 204, the ZC sequences mapped at ($2^{Nmax}/2^n$)-subcarrier mapping intervals in the frequency domain.

The mapping method (the demapping method) has been described above.

As described above, according to the method for generating the reference signal of the present embodiment, the wireless transmission device 100 and the wireless reception device 200 generate reference signals by using the ZC sequence having a sequence length corresponding to the ratio of the subcarrier spacing of data to the maximum subcarrier spacing (i.e., $2^n/2^{Nmax}$).

In addition, the wireless transmission device 100 maps the generated ZC sequence to subcarriers at a mapping interval corresponding to the ratio ($2^{Nmax}/2^n$) of the maximum subcarrier spacing to the subcarrier spacing of data. That is, the wireless transmission device 100 continuously transmits ZC sequences equal in number to the above-described ratio ($2^{Nmax}/2^n$) in the time domain. Furthermore, the wireless reception device 200 extracts the ZC sequences from the received reference signals on the basis of the mapping interval corresponding to the above-described ratio ($2^{Nmax}/2^n$).

According to the present embodiment, in the case where different subcarrier spacing values are applied between neighboring cells, the OFDM symbol lengths of the reference signals (for example, DMRSs) differ between the cells. However, the sequence lengths of the ZC sequences constituting these reference signals are the same. That is, in each of the cells in the communication system, a ZC sequence is used that has a sequence length substantially the same as the OFDM symbol length (or the FFT window) for the maximum subcarrier spacing (that is, in the case where the OFDM symbol length becomes the smallest), regardless of the actually set subcarrier spacing for transmission data. In addition, in each of the cells, the generated ZC sequence is repeatedly transmitted in the time domain in accordance with the OFDM symbol length for the actually set subcarrier spacing for the transmission data.

For example, as illustrated in FIG. 8A, in the LTE Uplink, the ZC sequence is mapped to each of the subcarriers and has a sequence length corresponding to the OFDM symbol length. In contrast, as illustrated in FIG. 8B, according to the present embodiment, the ZC sequence is mapped to the subcarriers at mapping intervals determined in accordance with the ratio between the set subcarrier spacing and the maximum subcarrier spacing (in FIG. 8B, every 4 subcarriers). In the time domain, ZC sequences equal in number to the number corresponding to the mapping interval (in FIG. 8B, 4 subcarriers) are continuously transmitted in the duration of the OFDM symbol length.

As a result, among the ZC sequences constituting the reference signals generated in the cells, the entire sequence length is included regardless of the subcarrier spacing set for each of the cells. Consequently, excellent cross-correlation property is obtained.

Figure 9:
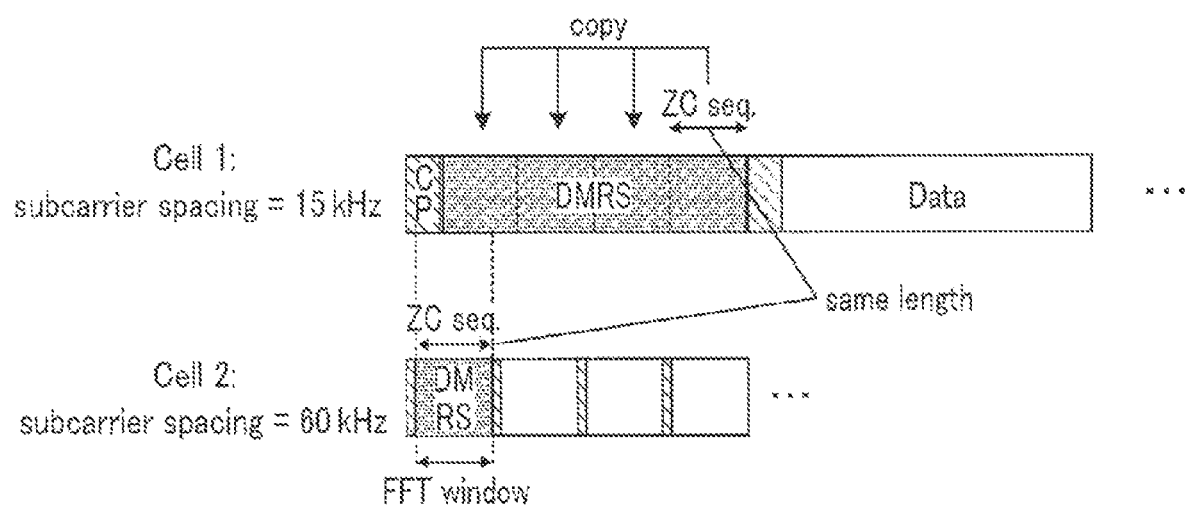
FIG. 9 illustrates an example of the configuration of a symbol between cells having different subcarrier spacing values applied thereto according to the present disclosure.

For example, in terms of neighboring cells 1 and 2 illustrated in FIG. 9, the subcarrier spacing of cell 1 is 15 kHz and the subcarrier spacing of cell 2 is 60 kHz. In this case, the time length of the OFDM symbol of the reference signal is four times longer in cell 1 than in cell 2. However, the reference signal of cell 1 is formed by repeating the ZC sequence constituting the reference signal of the cell 2 four times. As a result, as illustrated in FIG. 9, the ZC sequences constituting the reference signal of cell 1 are all included in the FFT window in the wireless reception device 200 (a base station or a terminal) in the cell 2. That is, even when, as illustrated in FIG. 9, the time-frequency resources to which the symbols of the reference signals are mapped in cell 1 and cell 2 overlap, the FFT window width in the reference signal reception process performed by the wireless reception device 200 (a base station or a terminal) of cell 2 has the same time length as one ZC sequence which is part of the reference signal of cell 1. Therefore, the cross-correlation property between the ZC sequences used as the reference signals in each of cell 1 and cell 2 is low. Consequently, in cell 2, deterioration in the accuracy of estimation of the channel of the reference signal using the ZC sequence can be prevented.

Figure 10:
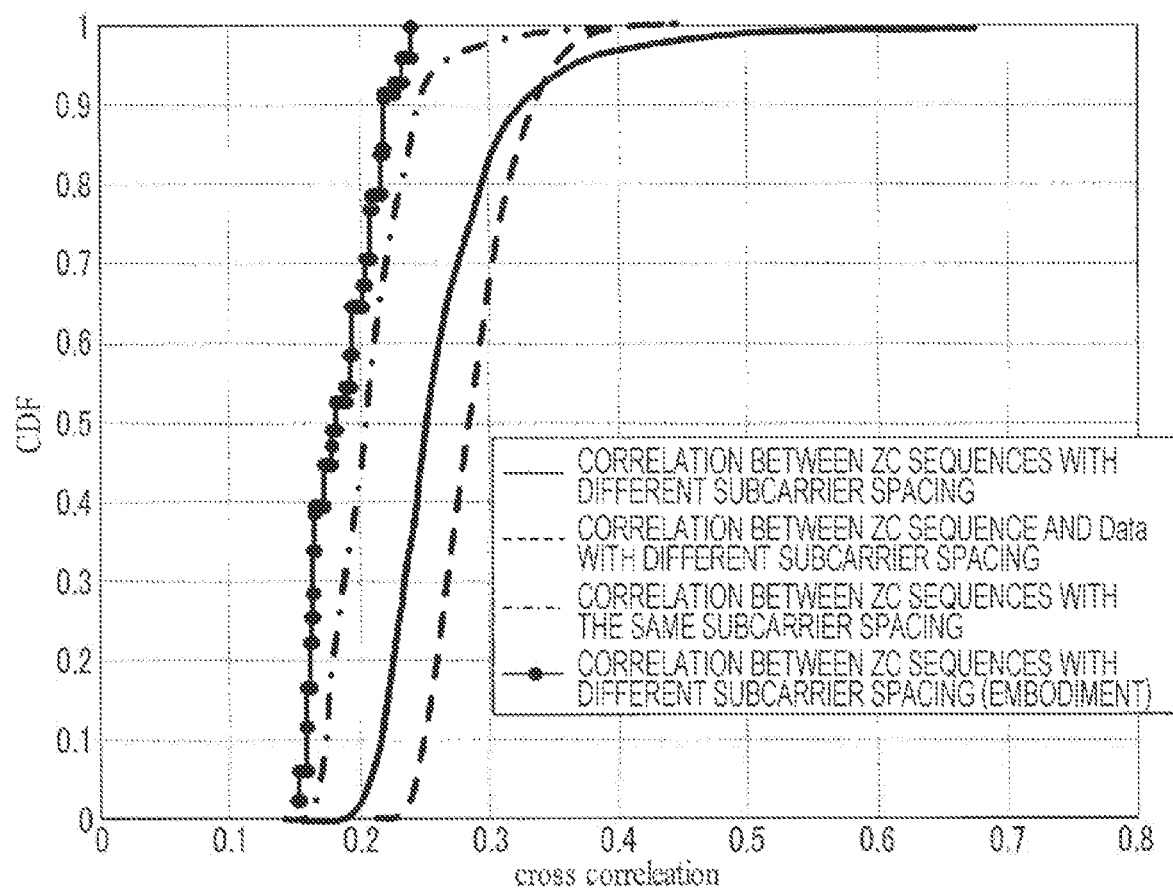
FIG. 10 illustrates an example of the cross-correlation property between ZC sequences.

FIG. 10 is a diagram illustrating an example of the cross-correlation property between ZC sequences in the case where the method according to the present embodiment is applied in addition to the computer simulation result illustrated in FIG. 3.

In FIG. 10, the result indicated by the label "Correlation between ZC sequences with different subcarrier spacing (embodiment)" is the result obtained by using a reference signal generated on the basis of the method described in the present embodiment. More specifically, in cell 1, the subcarrier spacing is set to 15 kHz, the reference signal band is set to 24 RBs (=4.32 MHz), the reference signal bandwidth $N_{SC}$=288 (=12×24) [subcarrier], and the sequence length $N_{ZC}$ of the ZC sequence=71 ($N_{ZC}$ is the largest prime number not exceeding $N_{SC} \times (1/4)$). In cell 2, the subcarrier spacing is set to 60 kHz, the reference signal band is set to 6 RBs (=4.32 MHz), $N_{SC}$=72 (=12×6) [subcarrier], and $N_{ZC}$=71. Furthermore, cell 2 serves as a receiving cell, and cell 1 serves as a transmitting cell from which an interference signal is transmitted.

As can be seen from FIG. 10, the reference signal generated by using the method described in the present embodiment can have the cross-correlation property comparable to that indicated by the label "Correlation between ZC sequences with the same subcarrier spacing" (an alternate long and short dash line). That is, an increase in cross-correlation value between ZC sequences with different subcarrier spacing can be prevented.

As described above, according to the present embodiment, the wireless transmission device 100 generates a reference signal by using the ZC sequence having a sequence length corresponding to the ratio (the first ratio) of the first subcarrier spacing set for the transmission data to the maximum settable subcarrier spacing and, thereafter, maps the ZC sequence of the reference signal to predetermined subcarriers at mapping intervals corresponding to the reciprocal of the first ratio (the second ratio) (that is, determines the number of repeated transmission operations of the ZC sequence in the time domain).

In this manner, even when different subcarrier spacing values are applied between the cells, the sequence length of the ZC sequence constituting a reference signal can be made the same among the cells. Therefore, even when the time lengths of the reference signals differ between the cells, significant inter-cell interference (inter-reference signal interference) is reduced. As a result, the accuracy of estimation of the channel of the reference signal using a ZC sequence can be increased.

In addition, according to the present embodiment, the generated reference signal is configured by repeating ZC sequences having low CM/PAPR property in the time domain. Consequently, the low CM/PAPR property as in LTE can be maintained.

OTHER EMBODIMENTS (1) While the above embodiment has been described with reference to the sequence length $N_{ZC}$ that is the largest prime number less than $N_{SC} \times (2^n/2^{Nmax})$ the sequence length $N_{ZC}$ may be the smallest prime number greater than $N_{SC} \times (2^n/2^{Nmax})$.

For example, if the bandwidth of the reference signal is 24 RBs ($N_{SC}$=288 [subcarrier]), the subcarrier spacing is 15 kHz (n=0), and the assumed maximum subcarrier spacing is 60 kHz (Nmax=2), then the $N_{ZC}$ becomes $N_{ZC}$=73 which is the smallest prime number greater than 288×(1/4)=72. To modify the size of the reference signal to be an integer multiple of the RB unit (12 [subcarrier]), the wireless transmission device 100 and the wireless reception device 200 cut out one sample located at the head or tail of the ZC sequence having a sequence length=73 and generate a reference signal with $N_{SC}$=288×(1/4)=72.

Even in this case, as in the above-described embodiment, even when different subcarrier spacing values are applied to different cells, it is possible to reduce the inter-cell interference (the inter-reference signal interference) and increase the accuracy of estimation of the channel of the reference signal using the ZC sequence.

(2) According to the above embodiment, reference signals having different mapping positions (Comb positions) in the frequency domain may be allocated to different cells. That is, the mapping positions of the reference signals in the frequency domain (also referred to as "Comb positions") may be associated with different sequence groups.

Figure 11:
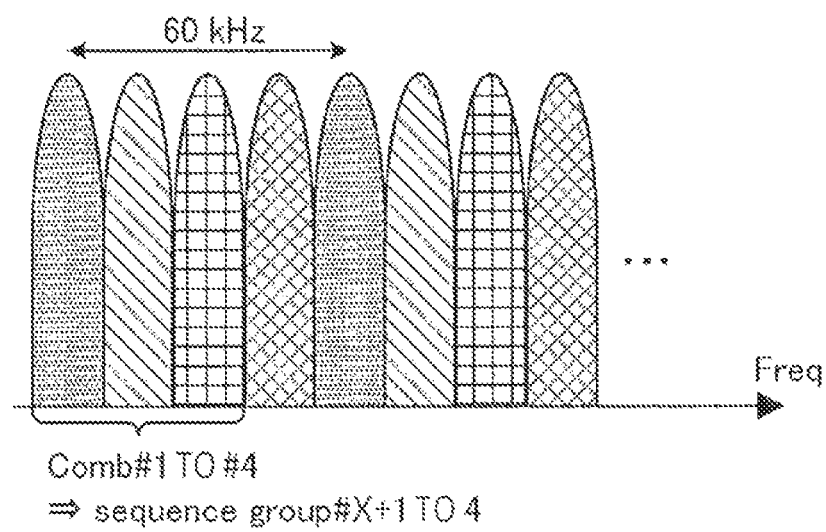
FIG. 11 illustrates another example of mapping of a reference signal according to the present disclosure.

For example, in LTE, the sequences having different values q in equation (1) are used as different sequence groups. In contrast, according to the present embodiment, sequences having different Comb positions (#1 to #4) illustrated in FIG. 11 in addition to different q values may be considered as different sequence groups. Note that as described above, the Comb positions (the mapping positions) belonging to the same sequence group are set for the subcarriers equal in number to the ratio of the maximum subcarrier spacing to the set subcarrier spacing ($2^{Nmax}/2^n$).

In this manner, the number of sequence groups that can be used in the whole system increases. Accordingly, the distance between cells using the same sequence group can be increased and, thus, the inter-cell interference of the reference signal can be reduced. Note that all of the Comb positions need not be used. Only some of the Comb positions with a low cross-correlation may be used as the reference signals.

(3) The decision whether or not to apply the reference signal described in the above embodiment may depend on an instruction from the base station. To send an instruction on whether or not to apply the above-described reference signal, the base station can use system information via RRC (Radio Resource Control) signaling, a physical channel (e.g., PDCCH (Physical Downlink Control Channel)), or a broadcast channel. Note that in the case where the reference signal described in the above embodiment is not applied, the subcarrier spacing values output from the subcarrier spacing setting units 105 and 205 ($2^n \times 15$ kHz and $2^{Nmax} \times 15$ kHz) may be set to the same value (n=Nmax).

(4) The above-described embodiment can be applied to DMRS or SRS. In addition, the above-described embodiment can be applied to a channel using a ZC sequence or a CAZAC (Constant Amplitude Zero Auto-Correlation) sequence (for example, PUCCH (Physical Uplink Control Channel) of LTE) in the same manner.

In addition, according to the above-described embodiment, the sequence used for the reference signal is not limited to a ZC sequence. For example, a sequence such as a CAZAC sequence having property similar to the property of the ZC sequence may be applied.

(5) According to the above-described embodiment, the parameters n and Nmax used for setting subcarrier spacing values ($2^n \times 15$ kHz and $2^{Nmax} \times 15$ kHz) may be negative values. For example, when the subcarrier spacing for the data is 3.75 kHz (n=−2) and the assumed maximum subcarrier is 15 kHz (Nmax=0), the wireless transmission device 100 and the wireless reception device 200 arrange the ZC sequence at four-subcarrier mapping intervals (every four subcarriers) (an interval of 15 kHz) in the frequency domain (that is, repeat the ZC sequence four times in the time domain) and generate a 3.75 kHz reference signal.

Figure 12:
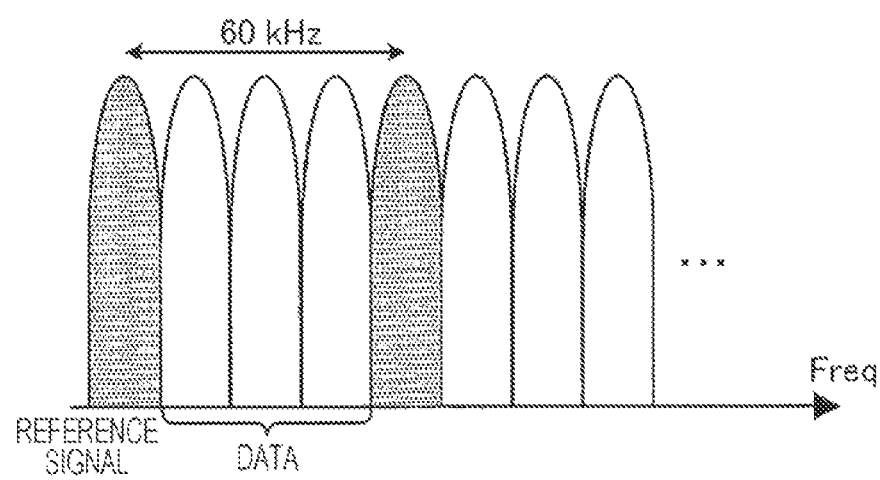
FIG. 12 illustrates an example of mapping of a reference signal and data according to the present disclosure.

(6) While the above embodiment has been described with reference to the data and the reference signal being different OFDM symbols and being time multiplexed, the present disclosure is not limited thereto. For example, as illustrated in FIG. 12, the data and reference signal may be frequency-multiplexed. Unlike a multi-carrier signal, in the case of frequency multiplexing, the CM/PAPR of the OFDM symbol increases. However, the data transmission efficiency increases. Therefore, frequency multiplexing and time multiplexing may be switched between a communication condition in which low CM/PAPR is not required and a communication condition in which low CM/PAPR is required. For example, the wireless transmission device 100 may switch to frequency multiplexing on downlink and time multiplexing on uplink.

(7) In Expression (3), the ratio of the subcarrier spacing set for the transmission data to the maximum subcarrier spacing is expressed as the ratio of $2^{Nmax}$ to $2^n$. However, the present invention is not limited to the expression. For example, the ratio may be expressed as the ratio of ($2^{Nmax} \times$ 15 kHz) to ($2^n \times 15$ kHz) or the ratio of Nmax to n.

(8) The values of the parameters are not limited to those used in the above-described embodiment (e.g., a reference value of subcarrier spacing: 15 kHz, and the allocated band (the number of RBs) of the reference signal).

(9) While the above embodiment has been described with reference to an example of an aspect of the present disclosure implemented by hardware, the present disclosure can be implemented by software, hardware, or software in cooperation with hardware.

Some or all of the functional blocks used in the description of the above embodiment may be partially or entirely implemented as an LSI circuit which is an integrated circuit, and each of the processes described in the above embodiment may be partially or entirely controlled by a single LSI circuit or a combination of LSI circuits. The LSI circuit may be composed of individual chips or may be composed of a single chip so as to include some or all of the functional blocks. The LSI circuit may have a data input and a data output. The term "LSI circuit" is used herein, but the term "IC", "system LSI circuit", "super LSI circuit" or "ultra LSI circuit" may be used as well depending on the level of integration.

In addition, the circuit integration is not limited to LSI and may be achieved by dedicated circuitry or a general-purpose processor. Alternatively, a field programmable gate array (FPGA), which is programmable after fabrication of the LSI, or a reconfigurable processor which allows reconfiguration of connections and settings of circuit cells in LSI may be used. The present disclosure may be implemented as digital processing or analog processing.

Moreover, should a circuit integration technology replacing LSI appear as a result of advancements in semiconductor technology or other technologies derived from the technology, the functional blocks could be integrated using such a technology. Another possibility is the application of biotechnology, for example.

According to the present disclosure, a wireless transmission device includes a generation unit that generates a reference signal by using a sequence having a sequence length corresponding to a first ratio of first subcarrier spacing set for transmission data to the maximum settable subcarrier spacing, a mapping unit that maps the sequence of the reference signal to predetermined subcarriers at mapping intervals in accordance with a second ratio which is the reciprocal of the first ratio, and a transmission unit that transmits the transmission data and the reference signal.

In the wireless transmission device according to the present disclosure, the sequence length is the largest prime number not exceeding a value obtained by multiplying the first ratio by a bandwidth of the reference signal.

In the wireless transmission device according to the present disclosure, the sequence length is the smallest prime number exceeding a value obtained by multiplying the first ratio by a bandwidth of the reference signal.

In the wireless transmission device according to the present disclosure, the mapping unit maps the sequence to subcarriers at equal intervals that are the subcarriers equal in number to the second ratio.

In the wireless transmission device according to the present disclosure, the transmission unit continuously transmits the sequences equal in number to the second ratio in a time domain.

In the wireless transmission device according to the present disclosure, the mapping positions of the reference signal in a frequency domain are associated with different sequence groups, and each of the mapping positions belonging to the same sequence group is set for one of the subcarriers equal in number to the second ratio.

In the wireless transmission device according to the present disclosure, the sequence is a Zadoff-Chu sequence In the wireless transmission device according to the present disclosure, the reference signal is a DMRS (Demodulation Reference Signal).

According to the present disclosure, a wireless reception device includes a reception unit that receives a reception signal including transmission data and a reference signal transmitted from a wireless transmission device, a generation unit that generates a replica of the reference signal by using a sequence having a sequence length corresponding to a first ratio of first subcarrier spacing set for the transmission data to the maximum settable subcarrier spacing, a demapping unit that extracts the sequence mapped to a predetermined subcarrier from the reference signal on the basis of mapping intervals in accordance with a second ratio which is a reciprocal of the first ratio, a channel estimation unit that calculates a channel estimation value by using the extracted sequence and the replica, and a frequency domain equalization unit that performs an equalization process on the transmission data by using the channel estimation value.

According to the present disclosure, a transmission method includes generating a reference signal by using a sequence having a sequence length corresponding to a first ratio of first subcarrier spacing set for transmission data to the maximum settable subcarrier spacing, mapping the sequence of the reference signal to predetermined subcarriers at mapping intervals in accordance with a second ratio which is a reciprocal of the first ratio, and transmitting the transmission data and the reference signal.

According to the present disclosure, a reception method includes receiving a reception signal including transmission data and a reference signal transmitted from a wireless transmission device, generating a replica of the reference signal by using a sequence having a sequence length corresponding to a first ratio of first subcarrier spacing set for the transmission data to the maximum settable subcarrier spacing, extracting the sequence mapped to a predetermined subcarrier from the reference signal on the basis of mapping intervals in accordance with a second ratio which is a reciprocal of the first ratio, calculating a channel estimation value by using the extracted sequence and the replica, and performing an equalization process on the transmission data by using the channel estimation value.

An aspect of the present disclosure is useful for a mobile communication system.

REFERENCE SIGNS LIST 100 wireless transmission device
101 encoding unit
102 modulation unit
103, 107 mapping unit
104, 108, 212 IFFT unit
105, 205 subcarrier spacing setting unit
106, 206 reference signal generation unit
107 mapping unit
109 signal multiplexing unit
110 transmission unit
111, 201 antenna
200 wireless reception device
202 reception unit
203 signal separating unit
204, 209 FFT unit
207, 210 demapping unit
208 channel estimation unit
211 frequency domain equalization unit
213 demodulation unit
214 decoding unit

The invention claimed is:

1. A transmission device comprising:
  circuitry, which, in operation:
    generates a reference signal by using a sequence having a sequence length corresponding to a ratio of a configured subcarrier spacing to the maximum configurable subcarrier spacing; and
    maps the reference signal to subcarriers at determined intervals;
  and
  a transmitter, which, in operation, transmits the reference signal,
  wherein the determined intervals have a length that is a reciprocal of the ratio.

2. The transmission device according to claim 1, wherein the sequence length is the largest prime number not exceeding a value obtained by multiplying the ratio by a bandwidth of the reference signal.

3. The transmission device according to claim 1, wherein the sequence length is the smallest prime number exceeding a value obtained by multiplying the ratio by a bandwidth of the reference signal.

4. The transmission device according to claim 1, wherein the circuitry, in operation, maps the reference signal to subcarriers at the determined intervals that are equal intervals.

5. The device according to claim 1, wherein the transmitter, in operation, continuously transmits the sequences equal in number to the reciprocal of the ratio in a time domain.

6. The transmission device according to claim 1, wherein the mapping positions of the reference signal in a frequency domain are associated with different sequence groups, and
  wherein each of the mapping positions belonging to the same sequence group is set for one of the subcarriers equal in number to the reciprocal of the ratio.

7. The transmission device according to claim 1, wherein the sequence is a Zadoff-Chu sequence.

8. The transmission device according to claim 1, wherein the reference signal is a DMRS (Demodulation Reference Signal).

9. A transmission device comprising:
  circuitry, which, in operation:
    generates a reference signal by using a sequence in a system where a subcarrier spacing is variable; and
    maps the reference signal to subcarriers; and
  a transmitter, which, in operation, transmits the reference signal,
  wherein a sequence length of the sequence is based on a length of an OFDM symbol in the maximum configurable subcarrier spacing.

10. A transmission method comprising:
  generating a reference signal by using a sequence having a sequence length corresponding to a ratio of a configured subcarrier spacing to the maximum configurable subcarrier spacing;
  mapping the reference signal to subcarriers at determined intervals; and
  transmitting the reference signal,
  wherein the determined intervals have a length that is a reciprocal of the ratio.

11. A transmission method comprising:
  generating a reference signal by using a sequence in a system where a subcarrier spacing is variable;
  mapping the reference signal to subcarriers; and
  transmitting the reference signal,
  wherein a sequence length of the sequence is based on a length of an OFDM symbol in the maximum configurable subcarrier spacing.

* * * * *